United States Patent Office 2,941,894
Patented June 21, 1960

2,941,894

METALLIZED COATING COMPOSITIONS

Walter R. McAdow, Grosse Pointe Farms, Mich., assignor, by mesne assignments, to American-Marietta Company, Chicago, Ill., a corporation of Illinois No Drawing. Filed Mar. 16, 1955, Ser. No. 494,822

7 Claims. (Cl. 106—193)

This invention relates to metallized coating compositions comprising a film-forming material and metal mirror plate particles having a thickness in the range of about three millionths of an inch to about twenty-five millionths of an inch, preferably about five millionths of an inch to about fifteen millionths of an inch, said particles being individually transparent to the naked eye by virtue of their extreme thinness.

The novel metal mirror plate particles of the present invention exhibit intra-molecular light transmission which produces wholly unexpected and desirable decorative effects in combination with the film-forming material, which may be an organic film-former, or an inorganic film-former or a mixed inorganic-organic film-former. The coating compositions may be the well-known nitrocellulose lacquers or synthetic enamels formulated for baking use or for air dry application, for exterior use on cars or for interior use.

Particularly desirable effects are obtained with those types of film-forming coatings which are somewhat transparent and simultaneously clean and bright rather than dull and milky. Such coatings are transparent to a degree that they are at least partially translucent and thereby have a desirable depth due to the film-forming material, and a luster or "metallic" appearance due to the metal mirror plate particles, although this latter aspect may be modified by the use of auxiliary deeper colors or pigments.

The depth of the coating may be characterized as the optical sensation of distance apparent to the observer which is characteristic of the finish. Light is reflected from the surface of the somewhat translucent coating composition. Light is also transmitted and reflected within the translucent film by the metal plate particles, especially aluminum plates. Some light is transmitted through the aluminum plates and reflected by underlying similar plates of high reflectivity. The reflectivity of the mirror metal plate particles of the present invention is of a very high order, for example, 85% to 90% in the case of aluminum plates of five millionths inch thickness. The net result is to produce a combination of luster, brilliance and depth which has not been heretofore observed.

Further due to the extreme thinness of the mirror plate particles, there is achieved a remarkable covering power enabling the use of much smaller quantities of plate particles to achieve entirely new effects of brilliancy and depth. By varying the amount of mirror plates used in the film-forming coating vehicle, there may be obtained a variety of metallized effects as well as polychromatic effects. These effects are obtained by the addition of surprisingly small amounts of the metal plates which exhibit from 3 to 4 times the covering power of ordinary aluminum flakes in the coating composition.

The polychromatic effects are evidenced by a change in color of the finish depending upon the angle of view, intensity and nature of illumination and direction of the illuminating source. Skillfully adapted to the modern contours of the automobile body design, brilliant high lights contributed by the finish enhance the general design of the finished body.

Employing clear, transparent or colored, or even stratified pigmented films and utilizing desirable auxiliary colors of darker color, and lower reflectivity, multiple tones may be produced. From one angle the eye sees the coating as dark, from another as light and the colors separate and re-blend upon scanning from flat to irregularly curved surfaces. Under intense illumination, such as direct sunlight, the reflection is brilliant and it is almost as if the brilliance may be dimmed as desired by a mere change in lighting without otherwise having to change chemical formulation to alter the optical properties of the coating. The high reflectivity of the metal mirror plates of the present invention plus their internal light transmission properties augments these desirable features beyond that which is expected and that which hitherto has been achieved.

Coating compositions containing aluminum flake pigment have been in use for decorative, ornamental and individual purposes for some years. Ordinary aluminum flake pigment, available in commerce as a dry powder or paste suspended in a volatile organic solvent, is graded or classified in particle size distributions (see "Aluminum Paint and Powder," by Edwards (1936), Reinhold Publishing Company), varying from No. 400 sieve or below (ASTM specification E11-39) to a size large enough to be removed by separating processes.

The paint and enamel industry has preferred flake aluminum pigment finer than 325 mesh to prevent gritty finishes which are objectionable in finishing automobile bodies. "Extra Brilliant Varnish Powder," "Extra Fine Lining Paste" and "Standard Aluminum Paste," typical grades in commercial use, are each made independently by stamping or milling of aluminum metal, then grading and collecting.

It has been thought that a necessary requirement of ideal particle size of the aluminum pigment, either of leafing or non-leafing type, is that the individual particles have no dimension less than .005 millimeter or 0.0002 inch.

For the finest graded pigment finishes, the enamel formulators have been satisfied to approximate the so-called ideal by removing from 60 to 80% of particles smaller than 200 millionths of an inch. The commercial product made by milling the particles to sizes less than 200 millionths of an inch is known to impart a gray, milky appearance and impair brightness to the finished enamel film. These fine particles are removed to prevent the destroying of the clear clean basic color of the enamel which is highly desirable in the finish.

Aluminum used in conventional coating may be obtained from a dry aluminum powder or it may be in the form of a paste containing 65% of the particular aluminum grade desired and 35% of an aliphatic naphtha which prevents dusting and loose aluminum from being blown about.

The amount of aluminum used in a gallon of a coating varies, depending on the color with which it is to be blended and the shade or depth desired, but excess amounts produce dulling of the gloss in the coating which is undesirable. Also, the use of excess conventional aluminum particles in a coating composition often affects the application characteristics of the coating and results in a film disfigurement known as "mottling," "flocking" or "flooding" to the trade. The flake partly due to its size characteristics and partly due to the nature of the resin film-former tends to migrate into colonies and flocculate. When such coatings are sprayed the mottled areas may be described as pools of color surrounded by rings of aluminum particles.

With some coatings containing excess amounts of aluminum particles, such as in a cellulosic resin coating, the aluminum appears to be at the interface so that when this coating is sanded to produce a smooth finish prior to polishing, the sanded area shows a layer separation effect.

Also conventional aluminum materials vary in brightness depending on the mesh of the aluminum used, the coarser mesh being somewhat brighter than the extremely finely divided particle which appears grayer and not as bright. Under certain circumstances coarser particles may be more desirable because they produce a brighter more flashy color but the coarser size aggravates mottling.

Pigmented coatings, such as nitrocellulose coatings and synthetic resin enamel coatings, containing the metal mirror particles of the present invention not only have a very high degree of brilliance over a wide range of concentration and a high reflectivity, but they do not indicate any tendency to show the conventional mottling or flooding characteristic of ordinary aluminum flake finishes even in resin vehicles in which the conventional aluminum flakes mottle badly. When very wet coats of enamel or lacquer containing the very thin metal mirror particles of the invention are applied to panels, mottling is not observed. Also, when the lacquer is sanded and polished the film layers, to all appearances, are continuous and do not show any aluminum layers at the interface. As a result of these improved features, a brighter color results with the use of coatings containing the mirror plate particles of the present invention, and the covering capacity is far superior to conventional aluminum finishes formulated with the use of auxiliary opacifying agents such as carbon black, lamp black and other colorants.

Metal mirror particles obtained by breaking up vapor plated metal deposited in thicknesses of about 3 to 25 millionths of an inch, preferably about 5 to 15 millionths of an inch, on smooth surfaces are particularly adaptable for incorporating into coatings having high reflective characteristics. Those skilled in the art and science of vapor deposition of metals believe that the brightness and brilliance is due to the fact that the vapor deposited metal is so thin that oxidation is very minute and it is believed that the metal surface is protected by an oxidized film which appears to be very minute and quite different in character than the usual oxide film. The oxide film, extremely thin and but a fraction of the deposited metal film, is thought to be a pure smooth transparent oxide crystal whereas in regular conventional types of aluminum particles the surfaces are rough. Further the conventional particles being thicker oxidize more deeply, in strata, and are consequently duller. The conventional fine particle, such as aluminum, is more opaque and does not permit light to be transmitted through the particle. It has been noted in angular observation of colored panels containing these mirror plate particles of the invention that they show a brilliance much greater than the same enamel compositions containing the conventional metal particles.

For use as bright reflective surfaces in semi-opaque, transluscent plastic films and transparent molded composition where extreme brilliance and reflectivity are required which may be imparted by these mirror flakes, a great variety of resin vehicles may be employed.

Nitrocellulose, widely used in automotive finishes, is flammable, sensitive to heat and ultra-violet degradation, despite its excellent properties of toughness, hardness, low water absorption, good film strength and the ability of the film to release the last few percent of solvent in air drying coatings. It is desirable that flammability be reduced by blending with polyvinyl chloride-acetate resins or by using non-combustible plasticizers and resins. Nitrocellulose lacquers are protected against degradation by ultra-violet light by the proper selection of the pigment and the resulting films have high clarity and excellent durability.

The film-former and pigment must not react with each other. In the case of nitrocellulose, pigments which absorb ultra-violet light protect the film-former. Carbon black is such a pigment. Organic reds and maroons do not have the high degree of this protective property as does carbon black. The pigments used with nitrocellulose should have low oil absorption, to permit high concentrations in coating applications and good hiding power. Alkaline pigments are avoided.

A suitable nitrocellulose lacquer containing the mirror plate particles in accordance with the invention may contain 14–16 parts by weight of ½ second nitrocellulose, 16–17 parts by weight of an alkyd resin such as an oil modified phthalic alkyd having 37% phthalic acid anhydride, 47% coconut oil and 16% glycerine (non-drying alkyd), 4–5 parts by weight of suitable plasticizer (dibutyl phthalate), 2 parts of pigment (carbon black) and as little as .10 to .15 part by weight of aluminum mirror plate particles having a thickness of about 5 millionths of an inch. The aluminum particles are but a small part, only 2–3%, of the total pigment in these metallized finishes.

The metal mirror flakes are not the pigment as in the case of aluminum paints, and the transparent flakes are used in amounts insufficient to hide. The flakes are used in addition to pigment. The reflective power of polished aluminum is about 62% whereas that of vacuum deposited aluminum is about 85% and higher. The flake is transparent and consists of a metal core having an integral film of pure $Al_2O_3$ covering the surfaces thereof. The pure oxide does not interfere with transparency.

This is to be contrasted with the conventional lacquer employing aluminum flake pigment, for example, in which aluminum paste 325 mesh, is used in an amount of about .35–.45 part by weight. In the above compared formulations solvent makes up the balance.

In a lacquer the metal mirror plate particles impart to the films a brightness and brilliance and a three-dimensional effect not obtainable with the conventional aluminum powder or flakes, and the quantity of said flakes used to obtain these effects is about ¼ to ⅕ the quantity of aluminum conventionally used to make metallized lacquers in accordance with conventional procedures. The conventional metallized lacquers deposit a film which is flat, dull and lacking in brilliance. The conventional aluminum particles impart a gray cast to black enamel.

The following advantages are found in a lacquer or enamel using vapor deposited aluminum against conventional aluminum powder or paste.

(1) Considerably more brilliant in general appearance.
(2) Brighter color and less graying due to aluminum content.
(3) Less settling of the aluminum particles.
(4) Better exterior durability.
(5) Better gloss retention.
(6) More uniform appearance which in the paint vernacular would mean less flooding.
(7) Less tendency to "seed"—seed is term used to denote the formulation of small specks after the paint has been packaged, apparently caused by local reactions within the paint.

Metallized lacquers are to be distinguished from conventional aluminum paints where aluminum powder or flake (opaque) is used in amounts of 10 to 15% by weight of the total composition, for its hiding power.

Since nitrocellulose lacquers applied by spraying techniques may "blush," i.e. condense atmospheric water vapor on the surface of the object being sprayed due to the cooling effect of the evaporation of the more volatile (ethylacetate, for example) water-miscible solvent components, a retarder may be added (butyl lactate or butyl Cellosolve) in an appropriate amount (5%) to adapt the lacquer for the prevailing atmosphere conditions such as humidity and temperature. The solvent formulation used for mixed resin nitrocellulose lacquers is adjusted to contain a sufficient quantity of the appropriate solvent for the resin which is present in an amount compatible with the cellulosic polymer and thereby prevent "resin blush." Further the solvent formulation desirably balances the volatile and less volatile ingredients (high boilers) to permit proper flow or leveling of the film and to prevent "orange peel" in the coating.

For a high solid content in nitrocellulose lacquer, it may be desirable to select a low viscosity type of nitrocellulose (a blend giving a low viscosity), a high ratio of a resin to nitrocellulose, the resin having excellent compatibility, and a strong solvent combination to obviate the deficiencies above. Dullness is avoided for automotive finishes particularly, so that aluminum and zinc stearates, colloidal silica etc., should not be included in automotive lacquers with the mirror plate particles of the present invention.

By careful solvent formulation and by approprite blending of different viscosity types of nitrocellulose (½ second and 5 seconds type, for example), the viscosity of the liquid coating and film strength of the finish is further modified by the mirror plate particles of the invention and balanced in a desirable manner to provide clear, tough, durable finishes for automobiles.

A further improvement may be obtained from the combination of certain resins with the nitrocellulose such as dammar, gum elemi, dewaxed bleached shellac, maleic-modified rosin, pentaerythritol-rosin esters, phthalic modified rosin, alkyd resins, amino resins, acrylic ester resins, polyvinyl chloride-acetate resins, etc.

Ethyl cellulose may be used to reduce the drying time of automotive nitrocellulose varnishes and may be added up to an equal amount with nitrocellulose. However, replacing part of the nitrocellulose with ethyl cellulose, although it does not affect exterior durability and provides a slower burning rate, produces film which is softer. Ethyl cellulose alone as the film-former with the mirror plate particles of the present invention has greater applicability to calendering coating processes for fabrics or for providing solvent free coatings on fabrics used for later embossing operations rather than as an automotive finish.

The use of thin films of acrylic resins about the mirror plate particles may protect the mirror plate particles. However, there is no leafing problem as with conventional aluminum flake which is encountered with the mirror plate particles of the present invention, and stearate leafing agents are not necessary. The mirror plate particles in accordance with the invention produce coatings of greater brilliance, depth and luster in amounts of about ¼ to ⅕ the amount employed in conventional aluminum paints or aluminum metallized paints.

The additive resin improves the gloss and fullness and maintains the clarity of the lacquer film, which is of importance in obtaining the novel optical effects in incorporating the new metal plate particles in accordance with the invention.

At equal concentrations, the compatible alkyl resin usually exhibits a lower viscosity than the nitrocellulose in solution, thereby desirably increasing the solids content of the lacquer at spray viscosity and reducing the number of coats for a required film thickness. Non-oxidizing types of alkyd resins are generally preferred to prevent lifting of the film in two coat operations and those alkyd resins exhibiting a solvent type plasticizing action for the nitrocellulose are preferred in order to provide proper flexibility and to limit the amount of chemical plasticizer in the formulation. The chemical type of plasticizer generally produces a weaker film than the resin type plasticizer and there is less tendency to exude or creep at temperature extremes.

The preferred resin components for clear automotive lacquers of good depth in accordance with the invention include the non-oxidizing thermoplastic short-oil glyceryl phthalate type alkyd resins which may be used alone or in combination with cellulosic resins, and which have pale color, are non-yellowing, have excellent durability and form a film which withstands mechanical polishing and has excellent cold-check resistance.

Medium and short-oil oxidizing type of alkyd resins may be used for one-coat applications, but care must be taken in formulating the solvent carrier to prevent lifting.

For automobile finishes, particularly, proportions by weight, up to 30 parts of non-oxidizing alkyd to 10 parts of nitrocellulose provide excellent durability. About 15 to 30% of solvent type plasticizer based on nitrocellulose weight ensure good flexibility and plasticizer retention in the film on aging.

High viscosity solvent type plasticizers have been commercially developed from linseed oil, soybean oil and castor oil and which are alcohol soluble are compatible with nitrocellulose and impart desirable toughness, flexibility and non-oxidizing, non-drying properties to clear and pigmented lacquers. These plasticizers tend to prevent "lifting" on the application of a second coat and are preferred components for automobile applications. Certain of these plasticizers exhibit a lower change of viscosity with decreasing temperature than the ordinary chemical plasticizer and these include alkyl ricinoleates, blown castor oil, refined oils, etc., which may be used alone or blended with older commercial non-solvent types such as AA castor oil.

Non-volatile, non-migrating polyester plasticizers such as the Paraplex resins (oil modified dibasic acid alkyd (sebacic acid) for example), are available at high viscosity, in excellent pale color, impart high flexibility, toughness and durability to lacquer film and display excellent retention in the coatings which are free from exudation. These plasticizers are low acid number alkyds, have excellent pigment wetting properties and high solvency for nitrocellulose. As a film-former of the invention they enhance the desirable film properties of nitrocellulose-alkyd-amino resin formulations, particularly where the amino resins are the urea and melamine formaldehyde resins used in baking finishes for automobiles.

Further, the alkyd formulations just mentioned permit additional or alternative modification with polyvinyl butyral or ethyl cellulose. If gasoline resistance of the finish is a desideration, the unmodified alkyd plasticizer, such as a straight thermoplastic sebacic alkyd of low acid number, is used instead of the oil modified alkyd plasticizer, although low temperature flexibility is somewhat sacrificed thereby.

Chemical plasticizers may also be incorporated in the coating, such as the well known di- and polyesters of phthalic, sebacic and orthophosphoric acid, 10–50% by weight of the resinous plasticizer types (alkyd or blown oil) being added to improve low temperature flexibility. Examples of these last named chemical plasticizers are tri-octyl phosphate, dioctyl phosphate, dioctyl phthalate and dioctyl phthalate ricinoleate. Some of these chemical plasticizers, for example, tricresyl phosphate, also reduce flammability. Another example is the use of trichloroethyl phosphate (50 parts) which reduces the flammability of a mixture of nitrocellulose (100 parts) and a polyvinyl-chloride-acetate copolymer obtained from 62% vinyl chloride 38% vinyl acetate (100 parts). Chlorinated phthalate esters provide similar advantages. The vinyl chloride polymer just mentioned also reduces flammability, improves resistance to chemicals and further reduces plasticizer migration in automobile finishing particularly where a vinyl polymer primer is used before the lacquer coating is applied.

The plasticizers may be blended with the pigment to improve the dispersibility of the pigment in the finished lacquer. Instead of adding the mirror plate particles while suspended in an inert solvent to the paint mixture these particles may be added in appropriate amounts with, or in the absence of, a pigment to the paint mixture in the plasticizers of the type described above.

The amino resin, urea- or melamine-formaldehyde resin, usually from 15 to 25 parts of amino resin to 100 parts of nitrocellulose (R.S. ½ second), improves water spot resistance and gloss retention of automotive lacquer finishes applied by baking, and these are desirable components of the film-former in combination with the mirror plate particles of the present invention.

Acrylic resins may be used to provide new effects. Ethyl acrylate resin or methyl methacrylate resins have good adhesion, excellent color and transparency characteristics and good flexibility. Methyl methacrylate resins additionally impart hardness.

In non-automotive uses, other film-formers of the inorganic type, such as silicone resins, polymeric ethyl silicate finishes, water glass, titanium ester resins, etc., may be used where beneficial high reflection effects and brilliancy are to be obtained against a background which may vary in dullness. Dulling agents such as colloidal silica, zinc stearate, aluminum stearate, etc., may be incorporated, but these are useful in an entirely different manner of application, such as in cold coatings over concrete, mortar, stone or the like to provide brightening against a matte background.

Desirable effects outside of the automotive finishing field are also obtained by incorporating small amounts of the mirror plate particles of the present invention in aqueous dispersion resins, such as the butadiene-styrene copolymer latices, polyethylene latices, polytetrafluoroethylene latices, polymonochlortrifluorethylene latices, silicone emulsions (SM–61, General Elecrtic Company), sodium methyl siliconate (SC–50, General Electric Company), vinylidene chloride-acrylonitrile latex (Saran F122–A–15+A20), polyvinyl chloride latices (Geon and Pliovic), vinylchloride-acetate latices, vinylidene chloride latices, etc. These dispersions usually produce a flat finish and the incorporation of a very small amount of metal mirror particles provides new and desirable mottled effects as well as brilliant continuous films, which may also be applied in contrasting stripes or patterns next to the flat finish.

The sodium methyl siliconate material is strongly basic so that mirror plate particles which are inert are selected. Or aluminum mirror plates may be coated to be rendered inert. The latices may be variously coated to glass, stone, plaster, concrete, fabric, paper, wood, etc., depending on their chemical nature. Thixotropic addition agents may be added to make the latex thick enough to provide decorative streaking effects. In the thickened latex the controlled handling of the mirror plate particles may provide attractive patterns in the very viscous coating mass.

In the so-called "rubber base" latex the flat or velvet finish may be toned up to introduce desirable added color effects particularly where deep colors (royal blue, for example) are used. Or a clear coat of translucent latex mixed with the mirror plate particles may be used over a deep color "rubber latex" coat to provide a semi-transparent "window coating" giving desirable polychromatic effects on interior walls.

The mirror plate particles may be used for special purposes not only in continuous coatings, but also in printing inks, rotogravure inks and xerographic inks (see the powdered dye pigments in Carlson, U.S. 2,297,691, at page 3, column 2, lines 55–70, for example, indicating the type of modification of pulverized resin formulations in xerographic inks). These xerographic inks may be improved by adding mirror plate particles in lieu of the metal powder disclosed therein. Such plate particles in the powdered resin exhibit the property of electroluminescence, see "Journal of the Optical Society," September 1954, article by Schwartz et al.

Various color effects are obtainable not only due to the color of the metal particle, copper and aluminum, for example, but also due to interference colors in the film and due to the various colors of the oxide films of the different flake particles, so that in printing ink applications, different areas may be colored differently by appropriately selecting several different kind of metal mirror particles or even mixtures of these.

Desirable color effects are obtained with printing inks which are made from transparent resins such as maleic or fumaric modified resins prepared from rosin, glycerine or pentaerythritol and the modifier, rosin-modified phenolic resins and the like. Such resins preferably have a melting point between 145–180° C., an acid number of 10–40, a viscosity of about 20–150 poises in 60% xylol, and a viscosity in the melt between about F and Z on the Gardner scale.

The ink formulation may be made up by adding 8 parts of resin to 14 parts of blown oil (castor, linseed, Chinawood or other drying oil), heating and adjusting to constant viscosity, and adding 8 parts of the mixture to 4 parts of pigment and about 0.08 part or more of aluminum or other metal mirror plate particles in accordance with the degree of metallization desired.

Similarly, formulations as above may be made in rotogravure inks prepared from terpene modified phenolic resins, such as Durez 220V, having a melting point of 157–167, an acid number of 5–13 and a viscosity of W on the Gardner scale. This terpene resin is believed to have about 3–12 coumaroneindene monomer units in the carbon to carbon chain. A further resin ink vehicle useful with the mirror plate particles is zinc resinate (Zitro, Zinar, Zirex, Newport Industries, Inc.).

Epoxy resins, the polyether condensation polymers of bis phenols (4,4'-dihydroxyphenyl dimethylmethane) and epichlorhydrin, modified with urea-formaldehyde, phenol-formaldehyde, etc. or esterified with fatty acid, or styrenated, represent a class of film-former having excellent transparency and hence are well suited as the resin vehicle. These resins may be cast in transparent form, and new, desirable brilliancy effects may be achieved by introducing the mirror plate particles.

Dyed nitrocellulose fingernail enamels may be pleasingly metallized in accordance with the invention by adding about 1 to 2% of the mirror plate particles, such as aluminum, by weight of the dye pigment (usually a lake of the dye) employed. The dye or dye lake is usually about 10% of the enamel.

It is evident that a great variety of coating formulations, varying from the highly colored asphalt paints and conventional white lead linseed oil paints to the phenolic, vinyl resin, styrene resin, hydrocarbon resin and rubber resin finishes, may be modified in a beneficial manner by adding appropriate amounts of the metal mirror plate particles in accordance with the present invention. Where the film characteristic is clear, transparent and glossy, uniform brilliancy effects are achieved. Where the film characteristic is flat, dull and non-reflective, brilliancy patterns may be introduced. Striping, streaking, overcoating, etc. produce other beneficial effects. Remarkable improvements may be achieved in color effects; a pure, white coating is made more reflective although somewhat metallized; a deep black is given a pleasing warmth of tone which is difficult to describe, but is readily seen and appreciated.

High transparency coatings useful in paper, textile, interior wood and other non-automotive finishing operations may be achieved by the invention. These coatings may use softer cellulose esters, such as cellulose acetate, cellulose acetate-butyrate, cellulose-acetate propionate, ethyl cellulose, etc. as the film-forming material in combination with the mirror plate particles of the present invention.

METHOD OF MAKING MIRROR PLATE PARTICLES

Thin metal films suitable for forming mirror plate particles of the order of about 3 to 25 millionths of an inch in thickness may be made by various methods which include:

1. Mechanical methods—
   (a) Rolling or beating, such as with gold foil
2. Chemical and electro chemical methods—
   (a) Electrodeposition, such as with chromium
   (b) Reduction, such as with silver mirrors
3. Physical methods—
   (a) Thermal evaporation such as aluminum, etc.
   (b) Cathode sputtering such as silver, copper, chromium, etc.

However, as a production method, the thermal evaporation process (vapor deposition) is preferred, since with commercial metals, such as aluminum, it is difficult to beat or roll aluminum to less than .001 millimeter, and except for metals like chromium, electro-deposited films are usually too thick. Chemical reduction methods are more difficult to control and more expensive.

Generally, methods of thermal evaporation and cathode sputtering are well known, see "Thin Films and Surfaces," by Winifred Lewis, Chemical Publishing Company, Inc., 1950, at pages 37–46. Substantially every metal may be deposited on a base by these latter methods and of these metals, the metals which have high reflectivity, intramolecular transparency and the necessary properties of inertness in the coating vehicle after being separated from the base and flaked, are preferred. These reflectivity and transparency properties as well as other properties have been described for various wave lengths (see "Thin Films and Surfaces").

Examples of the vapor deposition of aluminum and electrodeposition of chromium are now described.

(A) VAPOR DEPOSITION METHOD

The basic process applies a thin metal film to a base in a very high vacuum. Only three operations are necessary:
(1) The base is given a strippable organic coating to provide a mirror-smooth surface to carry the thin metal layer;
(2) The metal film is applied in a thickness of 5 to 25 millionths of an inch in the high vacuum chamber of evaporation of the metal from a heated filament; and
(3) The metal film is stripped from the base and broken up mechanically into particles.

The metal that is to form the coating film is evaporated at high temperature near the center of the vacuum vessel in such a way that the evaporated metal traveling in straight lines strikes the surface to be coated. Although the filament is hot enough to boil aluminum, the work stays at about the temperature of the room. The extraordinary high vacuum is needed to allow the metal to evaporate at temperatures that can be attained reasonably with a hot filament and also to permit the infinitesimally small particles of the evaporated metal molecules to travel over the considerable distance necessary to reach the work without in the meantime having been impeded by hitting molecules of the air filling the space.

By a series of high speed vacuum pumps, the density of the air molecules in the space between the evaporating metal and its target can be reduced to a millionth or even a ten-imillionth of its original value and then a great many metal molecules, freed by evaporation can hit and stick to the work.

Although decorative electroplates are sometimes only a tenth of a mil thick, films common in vacuum metalizing are far thinner, usually only a few thousandths of a mil thick. The preferred metal for vacuum metalizing is aluminum, because it readily vaporizes under practicable conditions and because the film formed from it possesses high reflectance (85% average) in the thin layers employed.

Metallizing is carried out in large cylindrical coating chambers, as much as 5½ feet in diameter by four to six feet long. The cylinders are placed horizontally with one end opening to allow the work (base) to be put in on fixtures.

Diffusion pumps connected to the chamber may be backed up by mechanical pumps. Comparatively heavy tungsten filaments arranged along the axis of the cylindrical coating chamber are connected to an electric power supply that permits them to be heated to high temperatures in a few seconds. On each section of the tungsten wire are hung small pieces of the metal to be used for coating, aluminum, platinum, silver, copper, gold, tin, palladium, titanium, zinc, antimony, nickel, etc., in such a way that this will be melted and heated to the vaporizing point by the current in the tungsten wires. Any metal may be used capable of being vapor deposited under vacuum in the thickness range of about 3 to 25 millionths of an inch. The vacuum pumps are started. As soon as the pressure has been brought to the desired low point (less than one micron of mercury absolute pressure), the filaments are heated to evaporate the metal. The jigs containing the work expose the surface to the stream of metal vapor pouring from the hot filaments. Then the vacuum in the coating chamber is relieved and the work removed, still on its fixture. The cycle in the metalizing chamber consumes fifteen to thirty minutes, from loading the work into the chamber until it is removed. The work is kept dry, free from solvents that would evaporate in the vacuum and, if the relative humidity of the work room is low so that no moisture is absorbed or condensed on the surface of the work, the time required for reaching the requisite vacuum is materially shorter than when these conditions do not prevail.

Dyes can be introduced to change the shade of the bright aluminum to gold or practically any other color or shade that may be desired. While it is easily possible to apply metals other than aluminum by the same method, the characteristics of aluminum lend themselves best to vapor depositing production operations. For that reason aluminum is preferred unless some special purpose may require the use of another metal. For example to reflect infrared (heat) radiation, gold is preferred.

The evaporated metal film is not quite as dense as the massive metal and the mirror plate particles, say those about 5 millionths inch thick, which is the preferred particle thickness in accordance with the present invention, can be penetrated by moisture and solvents. For this reason, the mirror plate particles are handled as a suspension in an inert solvent, compatible with the film-former when added to an organic film-former.

A typical example of the removal of the vapor plated metal for coatings is given below.

Aluminum panels 5" x 16" were coated with a workable automotive black lacquer on both sides. A second set of ten 5" x 16" aluminum panels were coated with a release coating in the form of a maleic anhydride modified ester gum resin solution on both sides and allowed to air dry. These panels were placed in a vacuum plating chamber and were vacuum plated with aluminum. The resin coated panels showed a smoother, brighter plating whereas the panels coated with black lacquer were not as smooth or as bright indicating that some of the components in the black lacquer were removed from the film in the vacuum chamber. The preferred release coating used is the maleic modified ester gum. Other release coatings may be used; for example, gelatine may be used which is washed away with warm water. Polyvinyl butyral may be used which is washed away with a solvent.

The metallized surface of the resin is removed by scraping, with or without preliminary soaking in xylol or other solvent for the resin, after which the scrapings are added to xylol for thorough agitation and then a base color paste containing 20% pigment is obtained. A clear synthetic resin solution in xylol composed of alkyd resin, melamine resin and thinner is added. Upon agitating the mixture of broken mirror metal plate particles, resin and color paste, a clear homogeneous mixture is obtained. This composition is then reduced to spraying viscosity and sprayed on a test panel.

The flat surface dimensions of the metal mirror plate particles vary widely, but in the main they are of a size that can pass readily through a 300 mesh size screen. By continued agitation in xylol or other coating solvent the size of the particles can be made finer than a 350 or a 400 mesh. These very fine particles, especially those finer than a 400 mesh, are preferred for spray applications.

Other runs were made by using a vapor plated cellulose acetate film which had a resin release agent applied on the acetate film followed by vapor plating. The vapor metal mirror was removed by solvent scrubbing with a brush in one method. A second method was carried out by placing 6" x 28" strips in a can containing some xylol, closing the can and allowing solvent vapors to reflux, thus releasing the metallized film from the acetate film surface and then adding this mixture of metal mirror plates in solvent to a pigmented synthetic enamel composition.

Multiple coats, each separated by a release agent, may be formed by vapor deposition to provide a larger production of the metal mirror plate particles.

(B) ELECTROPLATING OF CHROMIUM

Using the apparatus as described in Sternfels, U.S. 2,099,873, which continuously electrodeposits metals on a moving belt (aluminum or stainless steel belt) and flakes off the deposited coating therefrom with a doctor blade, chromium mirror plate may be produced in thickness of about 10 millionths of an inch, using a $CrO_3$ concentration of 33 oz. per gallon at 25° C., an $SO_4$ concentration of 0.33 oz. per gallon, a cathode current density of 0.50 to 0.075 ampere per square inch and a time of about 4 to 6 minutes. The brightness of the chromium may be adjusted by varying the current density and the time in accordance with well known practice, see U.S. 1,802,463.

Improvement in producing flake from the film deposited on the moving belt may be realized by reversing the direction of flow between successive depositions, and plural electro-deposited films which separate from each other, each in the desired thickness, may be obtained. The period of time of reversal is about 1/100 the period of time for deposition, i.e. about 3 seconds. A further improvement is obtained by coating the belt with mineral oil or graphite, etc., to form a metal releasing intermediate coating which facilitates the stripping operation. This coating may be applied between the current reversal operations described in the preceding paragraph. The chromium mirror plate particles produced are highly reflective (upwards of 70%) and readily dispersible in the film-forming vehicles in accordance with the invention.

The improvements of this invention are demonstrated by the following examples which are given by way of illustration only. It is to be understood in these examples that each colored pigment is in the form of a finely divided suspension in an organic vehicle, the suspension having been prepared by any suitable means commonly employed in the coating or composition art, particularly by a ball-, pebble-, roller-, or buhrstone.

Examples 1 and 2 illustrate four formulae used as automotive varnishes. These are set up on a green color but, of course, are applicable for any color. The formulae are designated by Formula A which is the conventional type metallic lacquer; Formula B which is the same as A with the exception of the aluminum used; Formula C a conventional green metallic enamel and Formula D identical to C except for the change in aluminum.

The examples follow:

EXAMPLE 1

*Green automotive metallic lacquer (conventional type)*

FORMULA A

| | Percent by weight |
|---|---|
| Wet cellulose nitrate, R.S. ½ second [1] | 24.6 |
| Cocoanut alkyd resin [2] | 21.7 |
| Dibutyl phthalate | 7.0 |
| Phthalocyamine green pigment | 1.5 |
| Ferrite yellow pigment | 0.25 |
| Butyl acetate | 20.0 |
| Isopropyl alcohol | 4.0 |
| Methyl ethyl ketone | 12.0 |
| Toluol | 8.57 |
| Aluminum paste, 325 mesh [3] | 0.38 |
| | 100.00 |

[1] Commercial cellulose nitrate (65% nitro cellulose–35% ethyl alcohol), produced by Hercules Powder Company.
[2] Cocoanut alkyd resin (60.0% solids–40.0% xylol); solids (45.0% phthalic anhydride–33.0% cocoanut oil); produced by Rohm & Haas Co. under their resin name Duraplex ND–78.
[3] Produced by Metals Disintegrating Co. under their trade name MD–584 Aluminum Paste. Paste is 65% aluminum powder and 35% xylol.

*Green automotive metallic lacquer (new type)*

FORMULA B

| | Percent by weight |
|---|---|
| Wet cellulose nitrate, R.S. ½ second [1] | 24.6 |
| Cocoanut alkyd resin [2] | 21.7 |
| Dibutyl phthalate | 7.0 |
| Phthalocyamine green pigment | 1.5 |
| Ferrite yellow pigment | 0.25 |
| Butyl acetate | 20.0 |
| Isopropyl alcohol | 4.0 |
| Methyl ethyl ketone | 12.0 |
| Toluol | 8.57 |
| Deposited vapor aluminum mirror plate particles, about 5 millionths of an inch thick [3] | .38 |
| | 100.00 |

[1] Commercial cellulose nitrate (65% nitro cellulose–35% ethyl alcohol), produced by Hercules Powder Company.
[2] Cocoanut alkyd resin (60.0% solids–40.0% xylol); solids (45.0% phthallic anhydride–33.0% cocoanut oil); produced by Rohm & Haas Co. under their resin name Duraplex ND–78.
[3] Containing:
.055 aluminum (mesh 400 and finer)
.325 xylol
———
.380

EXAMPLE 2

*Green automotive metallic enamel (conventional type)*

FORMULA C

| | Percent by weight |
|---|---|
| Soya alkyd resin [1] | 58.3 |
| Melamine resin [2] | 6.5 |
| Phthalocyamine green pigment | 2.3 |
| Ferrite yellow pigment | 0.5 |
| Xylol | 10.9 |
| V.M. & P. naphtha | 18.0 |
| Butyl alcohol | 1.9 |
| Aluminum paste, 325 mesh [3] | 1.6 |
| | 100.0 |

[1] Phthalic anhydride 39, Soya oil 42 (60% solids) (40% xylol) — Rohm & Haas Co. Duraplex A–29.
[2] 60% solids, 20% butyl alcohol, 20% xylol — Monsanto Chemical's Resimene 881.
[3] 65% solids, 35% solvent — Metals Disintegrating's Standard Aluminum Paste MD–584.

Green automotive metallic lacquer
(new type)
FORMULA D

| | Percent by weight |
|---|---|
| Soya alkyd resin [1] | 58.3 |
| Melamine resin [2] | 6.5 |
| Phthalocyamine green pigment | 2.3 |
| Ferrite yellow pigment | 0.5 |
| Xylol | 10.9 |
| V.M. & P. naphtha | 18.0 |
| Butyl alcohol | 1.9 |
| Aluminum (new processed), about 5 millionths of an inch thick [3] | 1.6 |
| | 100.0 |

[1] Phthalic anhydride 39 } Rohm & Haas Co. Duraplex A-29.
Soya oil 42 (60% solids) (40% xylol)

[2] 60% solids } Monsanto Chemical's Resimene 881.
20% butyl alcohol
20% xylol

[3] Mesh 400 (or finer) up to 100 (or coarser)_____ [4] 0.15
Xylol _____ 1.45

[4] This approximate amount determined by aluminum vapor deposit on a continuous film such as cellophane and using a release agent such as a maleic anhydride modified ester gum. One gallon of enamel required 185 square ft. of deposit at 5 millionths of an inch thickness which calculates to 5.5 grams of aluminum. The conventional type required 38 grams.

Metal panels coated with Formulae B and D were superior to panels coated with A and C in being:

(1) More brilliant.
(2) Having brighter color and less graying due to aluminum.
(3) In showing less settling of the aluminum particles.
(4) Showing better exterior durability.
(5) Showing better gloss retention.
(6) Having more uniform appearance (less flooding).
(7) Less tendency to "seed."

In place of the pigments used above any of the following pigments may be used to make other colors: Monastrol Blue Toner BX, iron blue, arylide maroon dark, "Indo" maroon (thioindigoid vat dyestuff), chromium tetrahydrate, lead chromate, toluidine toners, Lithosol Yellow 3GD (nickel complex of an azo dye), ferrite yellow, red iron oxide and Indanthrone blue.

Further, other resinous film-formers may be used as shown in the next example.

EXAMPLE 3
Maroon enamel

| | Percent by weight |
|---|---|
| Hydrated iron oxide | 7.12 |
| Arylide maroon (dark) | 7.31 |
| Aluminum mirror plate particles (as in Formula B) | 0.20 |
| 50% China-wood oil modified, soya oil modified, pentaerythritol phthalate | 48.8 |
| Butanol modified urea formaldehyde [1] | 8.2 |
| Oil modified phenol formaldehyde (60% in xylol) | 1.2 |
| Cobalt naphthenate drier (2% in mineral spirits) | 0.15 |
| V.M. & P. naphtha | } To 100 |
| Mineral spirits | |
| Hiflash naphtha | |

[1] 60% solution in xylol.

Panels coated with the above enamel exhibited the same superiority characteristics as Formulae B and D in Examples 1 and 2.

EXAMPLE 4
Grey enamel

A grey enamel was made by substituting bone black .67%, lamp black 0.68%, red iron oxide 0.48% and titanium dioxide (rutile) 1.83% for the iron oxide and maroon pigment of Example 3.

EXAMPLE 5
Blue baking enamel

Instead of using the pigment of Examples 3 and 4, Monastrol blue 0.88% and bone black 0.31% was used as the pigment for the blue enamel and the amount of aluminum mirror plate particles was 0.055% (suspended in xylol).

The maroon, grey and blue enamels of Examples 3, 4 and 5 were coated on test panels. The panels were uniform, free from mottling, sagging and flooding and produced more brilliant reflection effects than control panels from enamels A and C.

The proportions given herein above are not intended to be limiting but rather to indicate the characteristics of some of the film-forming ingredients of the invention.

It is to be understood that the film-formers are usually in the form of solutions or suspensions in conventional liquids such as esters, ketones, alcohols, ethers, hydrocarbons and the like. Also the film-formers may normally be modified with one or more of the following: catalysts, driers, inhibitors, plasticizers, diluents and the like. The compositions of the vehicle (film-former plus modifiers) may be altered to make the resulting coating composition dry by evaporation, by simple air drying or by baking.

The above mentioned colored pigments, film-formers, solvents and modifiers per se and combinations are merely examples of suitable ingredients and are not intended to limit the invention. This invention is an improvement derived from the incorporation of special mirror metal particles into well known combinations of such colored pigments, film-formers, solvents and modifiers.

As seen in Examples 1 and 2, the metallizing effect produced in the enamel is clearly apparent and beneficial in a covering area of about 5.5 grams of metal mirror plate particles per 185 square feet (1 gallon) or about 40,000 to 60,000 square centimeters per gram.

The products of the invention are useful in coating any article on which a metallic or polychromatic finish is desired, the principal use for such enamels or lacquers being on automobile bodies.

It is apparent that many widely different embodiments of this invention can be made without departing from the spirit or scope thereof, and it is not intended to be limited except as indicated in the appended claims.

I claim:
1. A metallizing coating composition comprising a film-forming coating vehicle, pigment and a metallizing component, said metallizing component being present in amounts from 0.028% to 0.15% based on the weight of said composition and being aluminum, said metallizing component being particles produced by breaking up smooth surfaced film of metal formed by deposition on a smooth surfaced base, said film having a thickness in the range between 3 millionths of an inch and about 25 millionths of an inch, a reflectivity of at least about 85% and covering from 40,000 to 60,000 cm.$^2$/gm., said vehicle containing a material selected from the group consisting of cellulose nitrate, vegetable oil modified alkyd resin, amino-aldehyde resin and phenol-aldehyde resin and being one which sets to a matrix adherent to base materials and being of a nature to permit the passage of at least some light therethrough, and said pigment being present in an amount sufficient to limit light passage through the coating without rendering the coating opaque.

2. A metallizing coating composition comprising a film-forming coating vehicle pigment and a metallizing component, said metallizing component being present in amounts from 0.028% to 0.15% based on the weight of said composition and being chromium, said metallizing component being particles produced by breaking up smooth surfaced film of metal formed by deposition on a smooth surfaced base, said film having a thickness in the range between 3 millionths of an inch and about 25 millionths of an inch, a reflectivity of at least about 70% and covering from 40,000 to 60,000 cm.²/gm., said coating vehicle containing a material selected from the group consisting of cellulose nitrate, vegetable oil modified alkyd resin, amino-aldehyde resin and phenol-aldehyde resin and being one which sets to a matrix adherent to base materials and being of a nature to permit the passage of at least some light therethrough, and said pigment being present in an amount sufficient to limit light passage through the coating without rendering the coating opaque.

3. A metallizing coating composition comprising a film-forming coating vehicle pigment and a metallizing component present in amounts between about 0.055% and 0.15% by weight, said metallizing component being selected from the group consisting of aluminum, copper and chromium and being particles produced by breaking up smooth surfaced film of metal formed by deposition on a smooth surfaced base, said film having a thickness in the range between 3 millionths of an inch and about 25 millionths of an inch, a reflectivity of at least about 70% and covering from 40,000 to 60,000 cm.²/gm., said coating vehicle containing a material selected from the group consisting of cellulose nitrate, vegetable oil modified alkyd resin, amino-aldehyde resin and phenol-aldehyde resin and being one which sets to a matrix adherent to base materials and being of a nature to permit the passage of at least some light therethrough, and said pigment being present in an amount sufficient to limit light passage through the coating without rendering the coating opaque.

4. A coating composition as recited in claim 3 in which the organic film-forming material contains a vegetable oil modified alkyd resin.

5. A coating composition as recited in claim 3 in which the organic film-forming material contains cellulose nitrate.

6. A coating composition as recited in claim 3 in which the organic film-forming material contains an amino-aldehyde resin.

7. A coating composition as recited in claim 3 in which the organic film-forming material contains a phenol aldehyde condensation product.

References Cited in the file of this patent

UNITED STATES PATENTS

| | | |
|---|---|---|
| 2,266,638 | Hauser | Dec. 16, 1941 |
| 2,365,356 | Pilling | Dec. 19, 1944 |
| 2,642,404 | Pike | June 16, 1953 |
| 2,649,383 | Killian et al. | Aug. 18, 1953 |
| 2,662,027 | Pike | Dec. 8, 1953 |
| 2,685,121 | Davis | Aug. 3, 1954 |
| 2,701,901 | Pawlyk | Feb. 15, 1955 |
| 2,839,378 | McAdow | June 17, 1958 |

OTHER REFERENCES

Matiello: Protective and Decorative Coatings, vol. II, pages 557–559, publ. John Wiley & Sons, Inc., 1942, New York.